May 16, 1950     E. B. MILLER     2,507,608
APPARATUS FOR DEHYDRATING GAS AND RECOVERING
CONDENSABLE HYDROCARBONS THEREFROM
Filed Oct. 28, 1946     9 Sheets-Sheet 1
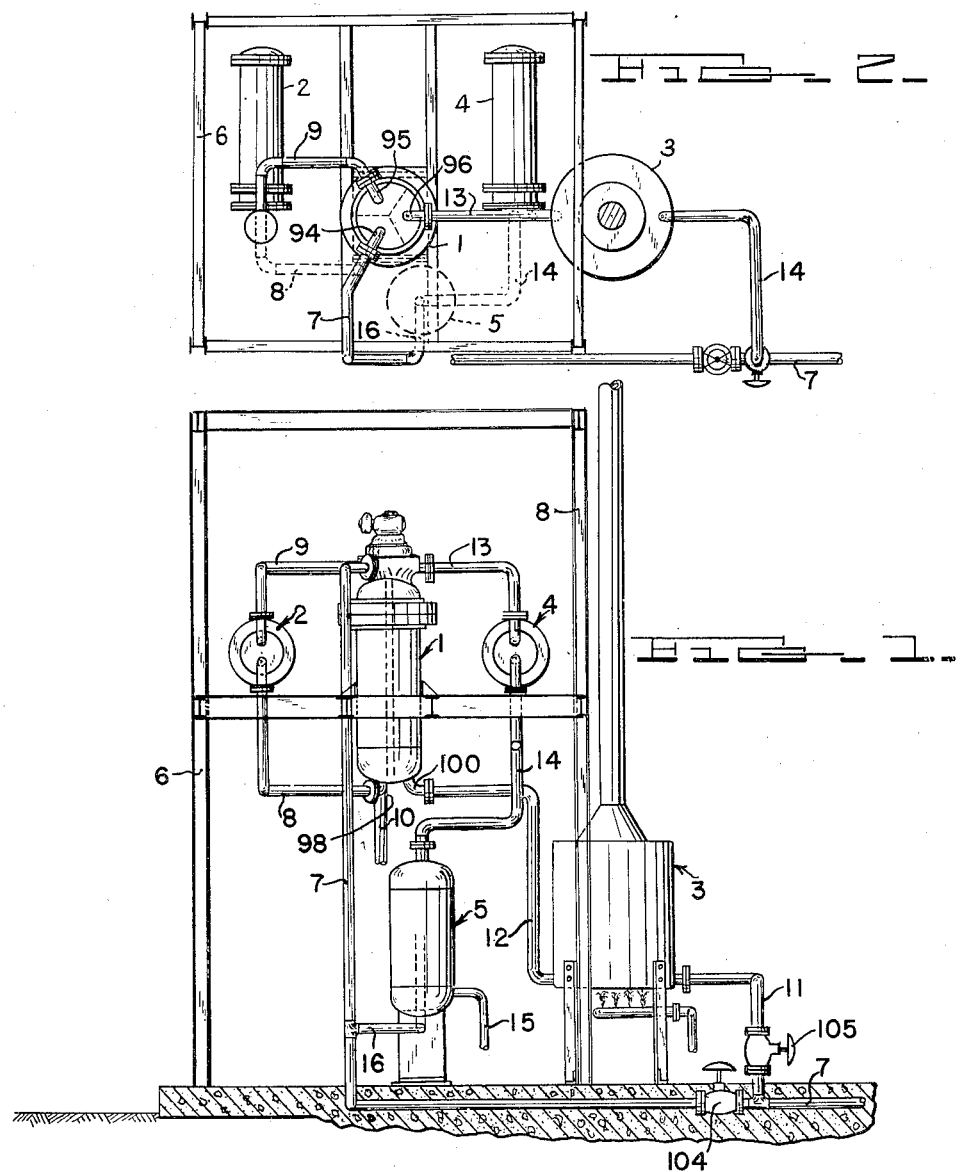
INVENTOR.
E. B. Miller
BY Adams+Bush
ATTORNEYS

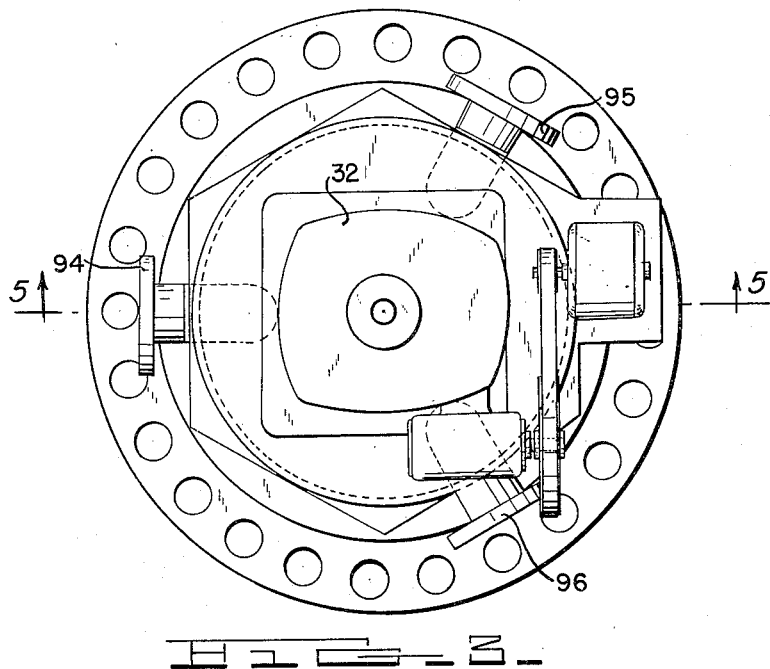
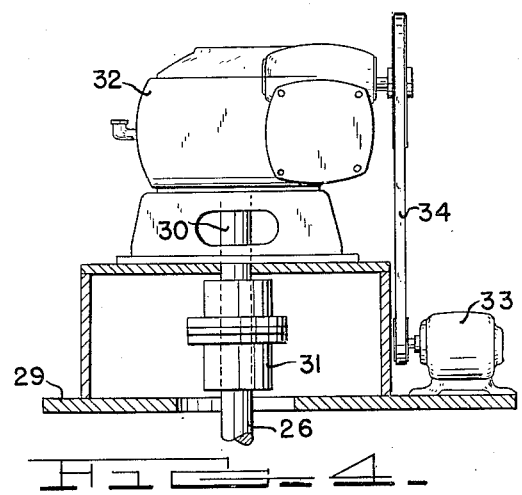

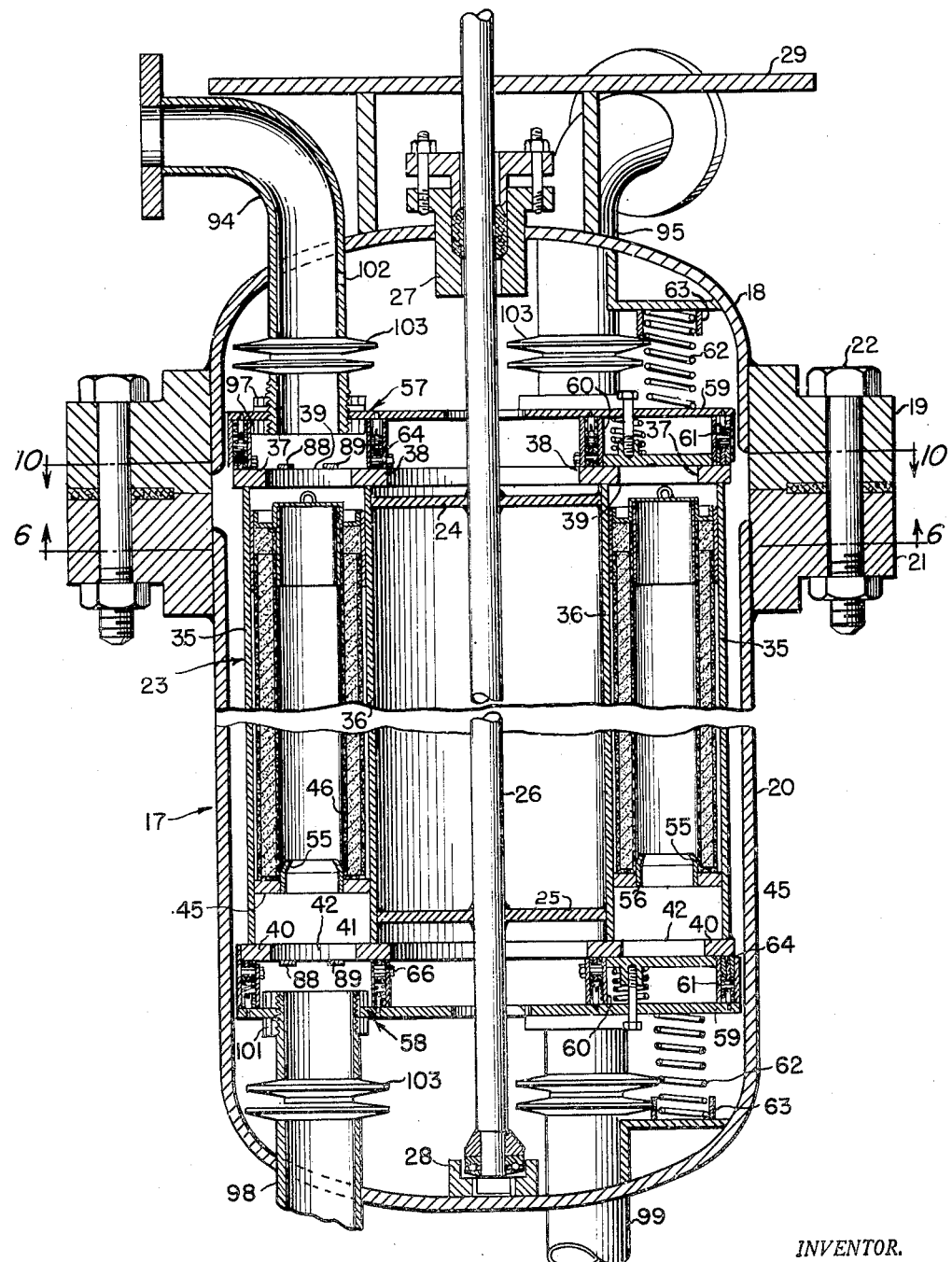

May 16, 1950 E. B. MILLER 2,507,608
APPARATUS FOR DEHYDRATING GAS AND RECOVERING
CONDENSABLE HYDROCARBONS THEREFROM
Filed Oct. 28, 1946 9 Sheets-Sheet 4
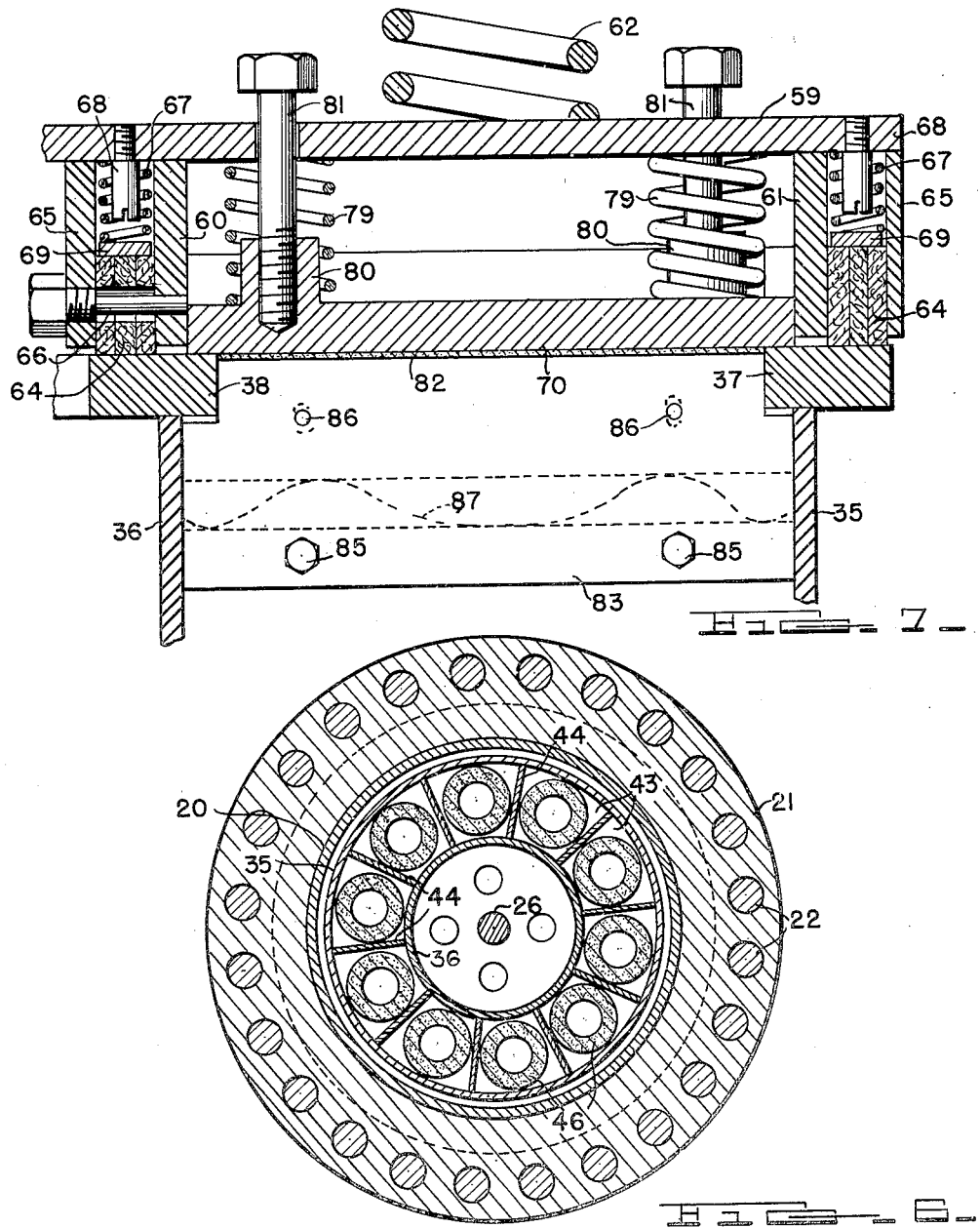
INVENTOR.
E. B. Miller
BY Adams + Bush
ATTORNEYS May 16, 1950 E. B. MILLER 2,507,608
APPARATUS FOR DEHYDRATING GAS AND RECOVERING
CONDENSABLE HYDROCARBONS THEREFROM
Filed Oct. 28, 1946 9 Sheets-Sheet 5

INVENTOR.
E. B. Miller
BY Adams & Bush
ATTORNEYS

May 16, 1950  E. B. MILLER  2,507,608
APPARATUS FOR DEHYDRATING GAS AND RECOVERING
CONDENSABLE HYDROCARBONS THEREFROM
Filed Oct. 28, 1946  9 Sheets-Sheet 6

INVENTOR.
E. B. MILLER
BY Adams + Bush
ATTORNEYS

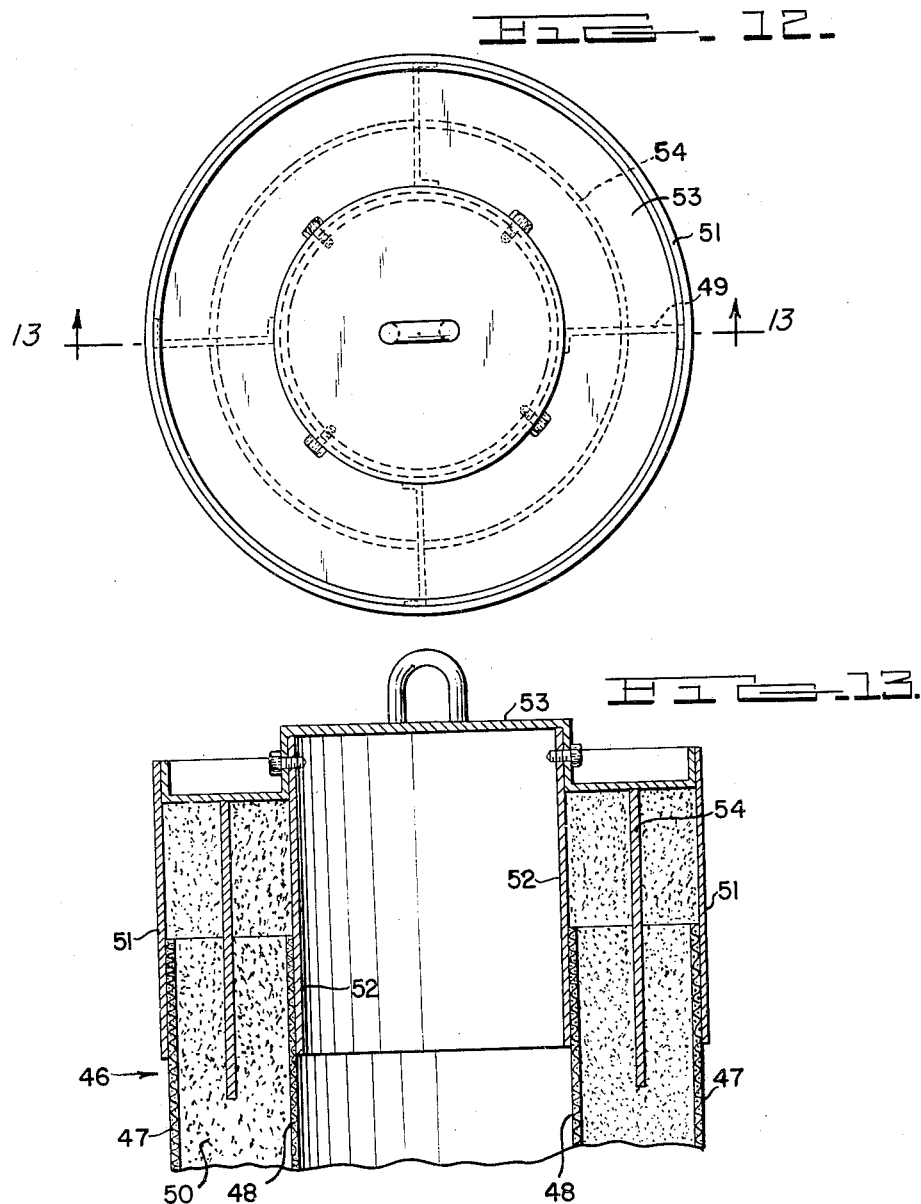

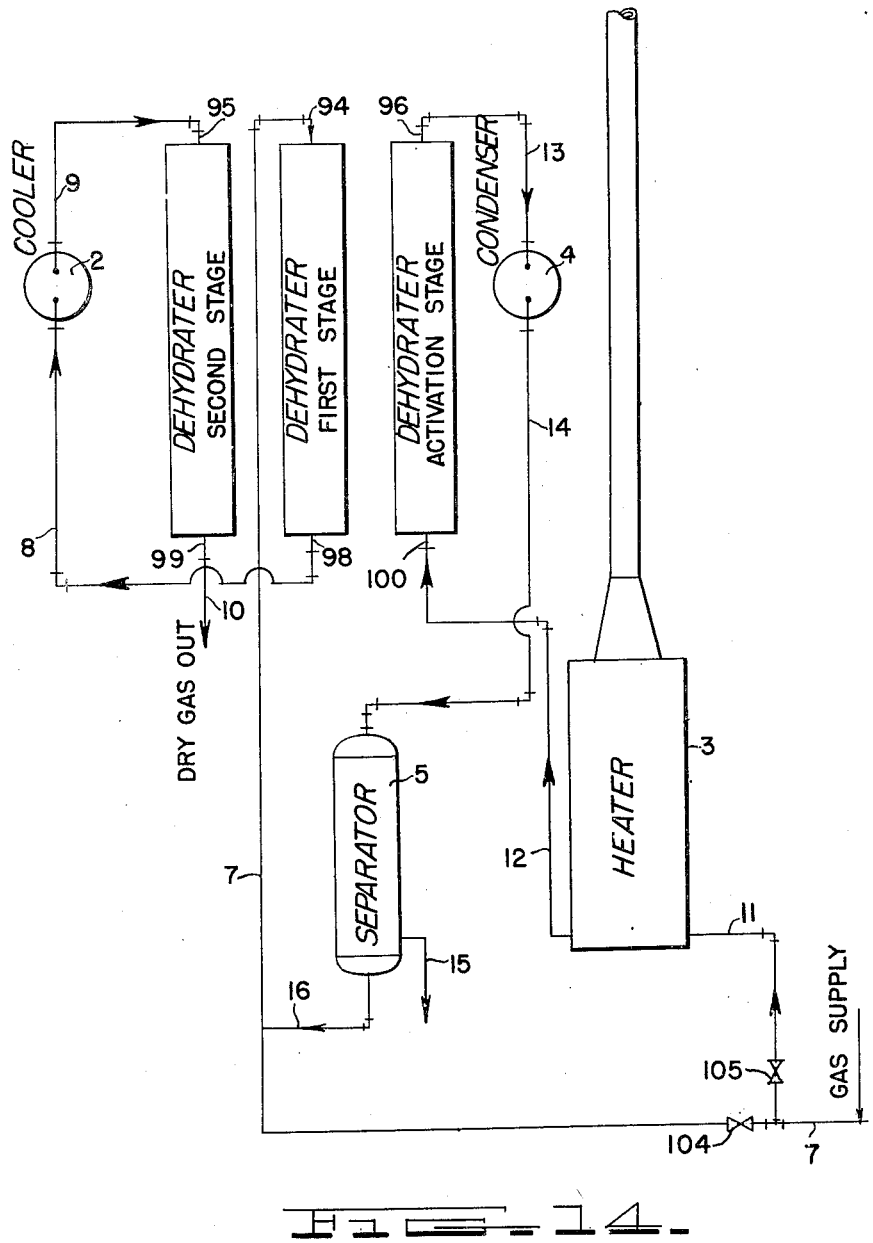

Patented May 16, 1950

2,507,608

UNITED STATES PATENT OFFICE 2,507,608

APPARATUS FOR DEHYDRATING GAS AND RECOVERING CONDENSABLE HYDROCARBONS THEREFROM

Ernest B. Miller, Houston, Tex.

Application October 28, 1946, Serial No. 706,108

7 Claims. (Cl. 183—4.6)

This invention relates to gas dehydration and has more particular reference to apparatus for removing moisture and condensable hydrocarbons from wet natural gas at the source, prior to transmission thereof through pipe lines and recovering the condensable hydrocarbons.

Natural gas transmitted through pipe lines always contains moisture. This moisture forms crystalline hydrates which clog the pipe lines and valves. Heretofore, the moisture has been removed from the gas at the point of entrance to the pipe lines by using different types of adsorbents, principally activated alumina and fluorite. The gas is usually pumped through large cylinders filled with the adsorbent material and the material is intermittently reactivated by cutting off the flow of gas and utilizing either heated air or gas. This requires the use of at least two adsorption units, including complicated control equipment, for directing the flow of wet gas through either unit.

Thus far, no attempt has been made to recover any gasoline as a by-product of the dehydration method. In fact, the usual adsorbents employed, such as alumina and fluorite, are not efficient for this purpose because the size of their pores is too large.

One of the objects of this invention is to provide apparatus for dehydrating wet gas using an adsorbent such as silica gel and recovering a large percentage of the condensable hydrocarbons, such as gasoline, etc.

Another object of the invention is to provide a gas dehydrator in which a plurality of adsorber units are continuously and successively moved into and through two or more dehydrating chambers and then into and through an activating chamber in which they are prepared for a repetition of the cycle.

Another object of the invention is to provide a gas dehydrator in which a large surface area of relatively thin adsorbent material, offering a minimum of resistance to the flow of gases, is condensed into a small cubic space.

Another object of the invention is to provide a system for removing moisture and condensable hydrocarbons from gas under high pressure.

Another object of the invention is to provide a system for removing moisture and condensable hydrocarbons from gas under high pressure including a gas dehydrator as characterized above wherein means are provided for continuously heating and recirculating gas through the activating chamber of the dehydrator.

Other objects and advantages of the invention will appear in the specification, when considered in connection with the accompanying drawings, in which:

Fig. 1 is a side elevation showing the mounting and arrangement of the apparatus of this invention;

Fig. 2 is a plan view of the apparatus shown in Fig. 1;

Fig. 3 is a plan view of the dehydrator;

Fig. 4 is a side elevation, partly in section, of the dehydrator driving mechanism;

Fig. 5 is a vertical sectional view of the dehydrator, taken on the line 5—5 of Fig. 3, but omitting the driving mechanism;

Fig. 6 is a horizontal sectional view of the dehydrator, taken on the line 6—6 of Fig. 5, but drawn to a smaller scale;

Fig. 7 is an enlarged vertical view of the seal shown in the upper manifold of Fig. 5;

Fig. 12 is a plan view of a cylindrical adsorbent containing unit;

Fig. 13 is a vertical sectional view, taken on the line 13—13 of Fig. 12;

Fig. 14 is a schematic view to show the flow of wet gas through the first and second dehydration steps, and the flow of hot gas through the activation stage and the condenser and separator.

Figure 8:
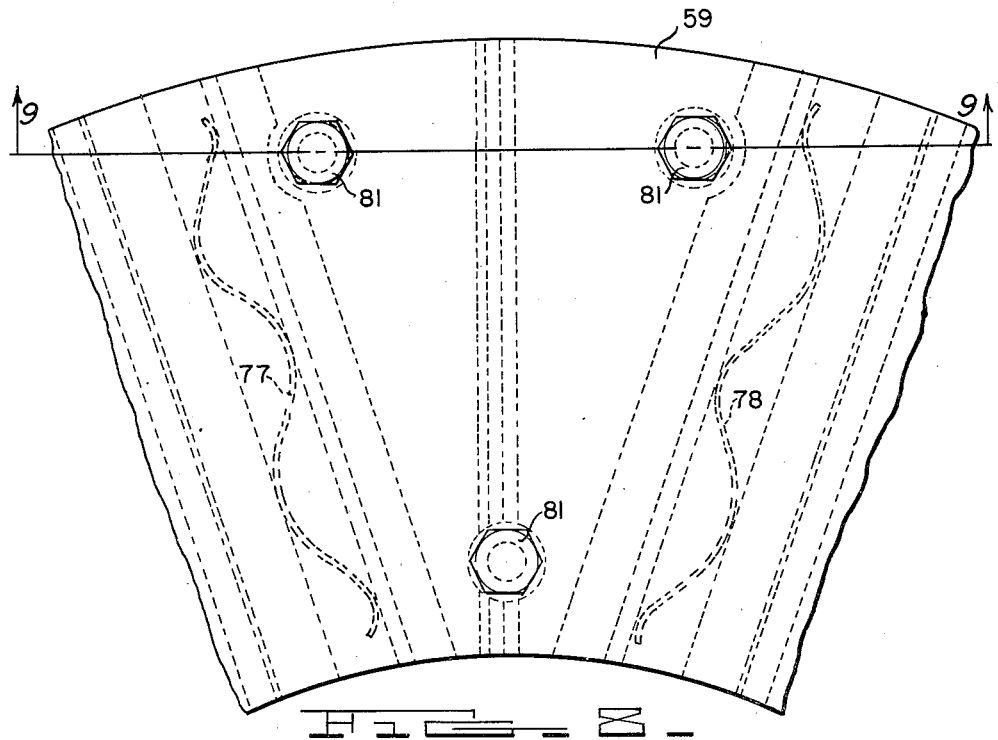
Fig. 8 is an enlarged plan view of the seal shown in the upper manifold of Fig. 5.

Referring now to the drawings, there is shown in Figs. 1 and 2, one embodiment of apparatus and the arrangement thereof for carrying out the method of this invention. The apparatus shown includes a three-stage dehydrator 1, the first and second stages of which are used to dehydrate the wet gas, the third stage being used to reactivate the adsorbent material within the dehydrator; an intercooler 2, employed to cool the wet gas between the first and second dehydration stages; a heater 3 employed to heat the gas used in the reactivating stage of the dehydrator; a condenser 4 employed to condense the moisture from the heated gas after it has passed through the reactivation stage of the dehydrator; and a separator 5 employed to separate the condensate from the gas. The dehydrator, cooler and condenser are preferably supported in a raised position by a suitable framework, indicated generally at 6.

The wet gas is delivered, at high pressure, from the usual compressor or source of supply (not shown), to the first stage of the dehydrator by means of a pipe line 7. After passing through the first stage of the dehydrator, during which passage some of the moisture was removed, the now partially dried gas passes through a pipe line 8 into the intercooler 2. From the intercooler, the cooled, partially dry gas passes through a pipe line 9 into the second stage of the dehydrator, where it is completely stripped of its remaining moisture. From the second stage, the now dry gas passes into a pipe line 10 for transmission to the points of use.

A portion of the wet gas is diverted from the supply pipe line 7, by means of a pipe line 11, through the heater 3, where its temperature is raised to from 300° F. to 600° F., depending upon the moisture content and the type of hydrocarbons to be recovered, and, from the heater, passes through a pipe line 12 into the third or reactivation stage of the dehydrator. The heated gas passes through the third stage, vaporizing and stripping the accumulated moisture and hydrocarbons from the adsorbent. The heated gas and its vapors stripped from the adsorbent pass through a pipe line 13 into the condenser 4, where the vapors are condensed; from the condenser, the gas and its condensates pass through a pipe line 14 into the separator 5 in which the condensate is separated from the gas. The separator is provided with a drain 15 for removing the water and hydrocarbons. The now cooled gas in the separator passes through a pipe line 16 back into the supply pipe line 7, where it mixes with the incoming wet gas on the way to the first stage of the dehydrator. The process is continuous.

The details of construction of the dehydrator 1 are shown in Figs. 1 to 13 inclusive. There is shown a cylindrical pressure vessel 17 comprising an upper shell or cap 18 having an annular flange 19 welded thereto and a lower shell 20 having an annular flange 21 welded thereto. The two shells are fastened together with their flanges forming a gas-tight joint, by means of bolts 22 to permit the upper shell or cover member to be removed. The vessel 17 forms a gas-tight housing for the adsorber unit and is capable of withstanding pipe line pressure.

The adsorber unit includes a rotatable annular drum 23 mounted within the vessel 17 and fixedly attached, by means of upper and lower plates 24, 25, to a central vertical shaft 26 journalled in a stuffing box bearing 27 formed in the upper shell or cap 18 and a step thrust bearing 28 secured to the bottom of the lower shell 20. A platform 29 for supporting the mechanism for rotating the drum is mounted on the cap 18.

The driving mechanism includes a shaft 30 connected to the upper end of shaft 26 by a coupling 31 (see Figs. 3 and 4). The shaft 30 is driven by suitable reduction gearing mounted in a housing 32, the reduction gearing being driven by a motor 33 by means of belting 34.

The rotatable annular drum 23 includes two spaced concentric cylinders 35, 36 which form the side walls of the drum (see Figs. 5 and 6). Two spaced concentric annular plates 37, 38, each secured to the top of the cylinders 35, 36, respectively, form the top of the annular drum, the space between the annular plates 37, 38 forming a continuous annular opening 39 in the top of the drum. Two spaced concentric annular plates 40, 41, each secured to the bottom of the cylinders 35, 36, respectively, form the bottom of the annular drum; the space between the annular plates 40, 41 forming a continuous annular opening 42 in the bottom of the drum.

The rotatable annular drum 23 is divided into a plurality of compartments 43 by radial partitions or diaphragms 44. In each of the radial compartments 43, near the bottom thereof, there is provided a plate 45 attached to the walls of the compartment, as by welding, to form a gas-tight joint. Each plate 45 forms a support for an elongated, foraminous, annular adsorbent container 46, which comprises two concentric tubular wire screens 47, 48 (Figs. 12 and 13), held in spaced relation by a plurality of longitudinal radial fins 49, with the annular space between the screens closed at the bottom. The mesh of the screens is such as to retain a granular adsorbent 50 in the annular space between the screens. The adsorbent employed may be any adsorbent having characteristics substantially like silica gel or the gel of other activated hydrous oxides. Preferably, silica gel is used. Each container 46 is closed at its top by means of concentric hoops 51, 52 mounted on the concentric screens 47, 48 and a cover plate 53 detachably connected to the inner hoop 52. An annular fin 54 is secured to the cover plate 53 and projects downwardly between the hoops 51, 52, all as shown in Figs. 12 and 13, the construction being such that, as the silica gel settles down, leaving a space between the top portion of the wire screen devoid of silica gel, the fin 54 will prevent gas from passing through the space devoid of silica gel.

Each container 46 has its bottom end detachably mounted on a hollow cylindrical hub 55 projecting upwardly from an opening formed in the plate 45, as clearly shown in Fig. 5. The hub 55 is secured in the opening 56 in the plate 45, as by welding, to form a gas-tight joint. Top and bottom manifolds 57, 58 are mounted on the top and bottom of the annular drum 23 and close the annular openings 39, 42 formed in the top and bottom of the drum. The top and bottom manifolds are identical in construction. Each is formed in the shape of an annular trough having an annular top (or bottom) 59 and annular side walls 60, 61.

A plurality of compression springs 62, mounted on brackets 63 suitably secured to the inner walls of the vessel 17, yieldably press the top and bottom manifolds against the top and bottom, respectively, of the annular drum. The top and bottom manifolds are held stationary relative to the rotation of the annular drum by means hereinafter to be described and, to prevent the escape of gas between the rotating drum and the manifolds, sealing ring gaskets 64 are placed at the junction of the side walls of the manifolds and the drum. The sealing ring gaskets 64 are held in tight sealing engagement with the top and bottom of the drum by means of annular hoops 65 (see Fig. 7) which engage the gasket and hold them against the side walls of the manifold. The upper (or lower) ends of the hoops 65 are secured to the top (or bottom) plate of the manifold, as by welding. The ring gaskets are retained between the hoops 65 and the side walls 60, 61 of the manifolds by means of a plurality of circumferentially spaced threaded bolts 66, which engage the ring gaskets and the lower portions of the hoops and side walls. The ring gaskets 64 are yieldingly held in engagement with the top and bottom of the drum 23 by means of a plurality of compression springs 67 mounted on stud bolts 68 secured to the top (or bottom) of the manifolds and engaging annular plates or members 69 mounted on the top (or bottom) of the ring gaskets, all as clearly shown in Fig. 7.

Figure 9:
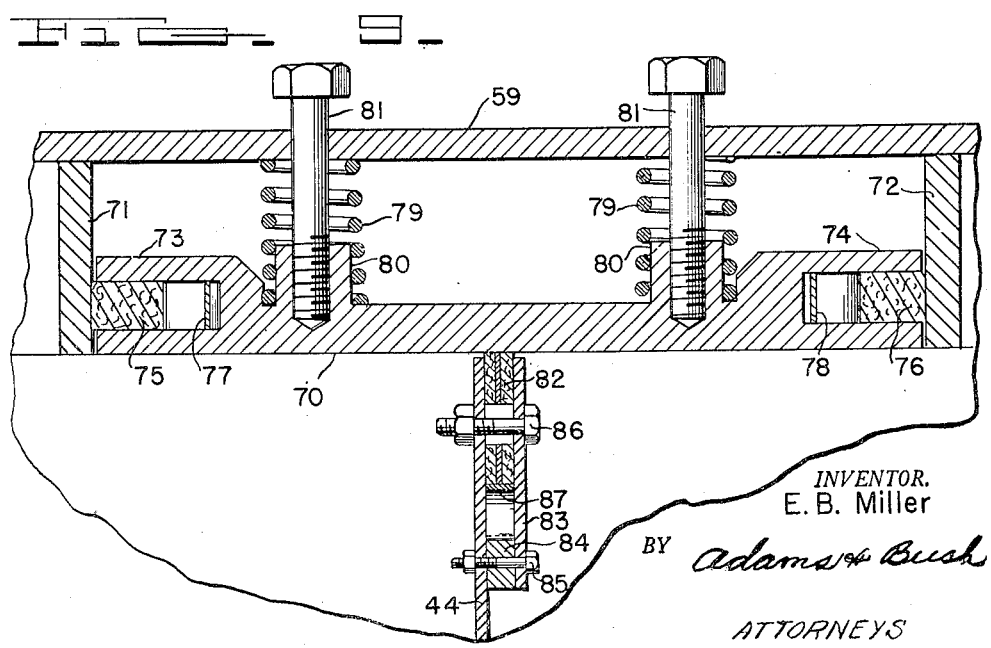
Fig. 9 is a vertical sectional view, taken on the line 9—9 of Fig. 8.

At three circumferentially spaced points in the top and bottom manifolds, there are located seals which, by reason of the sliding contact of the radial partitions 44 against the under surface of the bottoms of the seals, divide the manifolds and drum into three sectors, each sector gas-tight with respect to the adjacent sectors. The seals are identical in construction and the details thereof are best shown in Figs. 7, 8 and 9. Each seal includes a bottom or sealing plate 70 mounted within the manifold between spaced radial partition walls 71, 72. The bottom plate 70 is yieldingly urged against the top (or bottom) of the drum and rests on the concentric annular plates 37, 38 which form the top of the drum (or plates 40, 41 which form the bottom of the drum), as shown in Fig. 7. The side edges of the plate are bifurcated, as shown at 73, 74 for the reception of gasket strips 75, 76 which are yieldingly pressed outwardly against the partition walls 71, 72 of the seal by leaf springs 77, 78, as shown in Figs. 8 and 9.

The means for yieldingly pressing the bottom plate 70 of the seal against the top (or bottom) of the drum comprise a plurality of compression springs 79 mounted on projections 80, formed on the upper surface of the plate 70. The springs 79 engage the top (or bottom) of the seal and are held in position by bolts 81 projecting through the top (or bottom) of the seal and the coiled springs and threaded into the projections 80 formed on the plate 70.

Each radial partition or diaphragm 44 has a portion of its top and bottom edges extending upwardly between the edges of the openings in the top and bottom of the drum. A gasket 82 is secured on these portions and extends above (or below) their top (or bottom) edges and engages the under face of the bottom plate 70 of the seal.

Plates 83 are secured to the tops and bottoms of the partitions and are held spaced therefrom by a spacer strip 84, the plates and spacer strip being secured to the partitions by bolts 85. The gaskets 82 are confined between the partitions and the plates 83, as by means of bolts 86, and are pressed upwardly (or downwardly) against the under surface of the bottom plates 70 of the seals by means of leaf springs 87, all as shown in Fig. 9.

Figure 10:
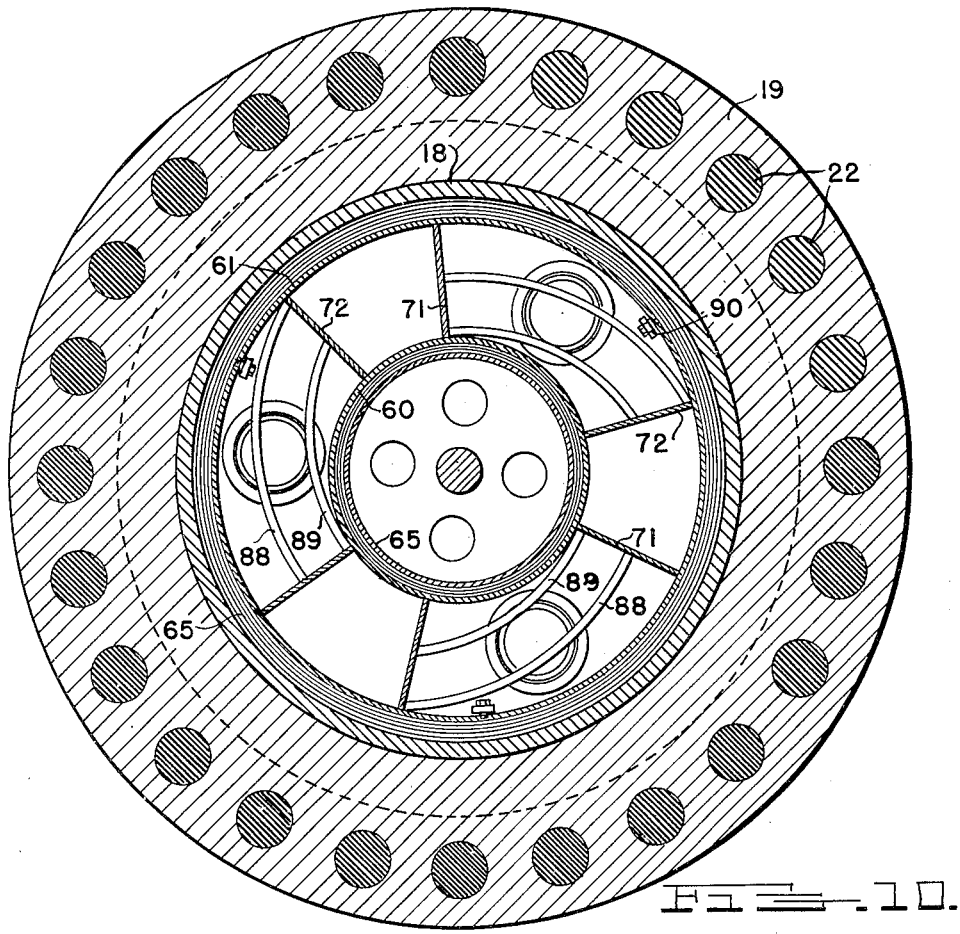
Fig. 10 is a horizontal sectional view of the dehydrator, taken on the line 10—10 of Fig. 5.

In order to prevent the gaskets 82 from being unduly pressed upwardly when the gaskets are not engaging the bottoms of the seals, means are provided for spanning the reaches of the manifolds between the seals. These means comprise spaced pairs of curved plates 88, 89 which extend between and are secured to the partition walls of the seal, as shown in Fig. 10. The bottom surfaces of the plates 88, 89 are in the same horizontal plane as the bottom surfaces of the bottom plates 70 of the seals, as shown in Fig. 5, so that, as the gaskets 82 move out of engagement with the bottom plate of the seal, they immediately engage the plates 88, 89.

Figure 11:
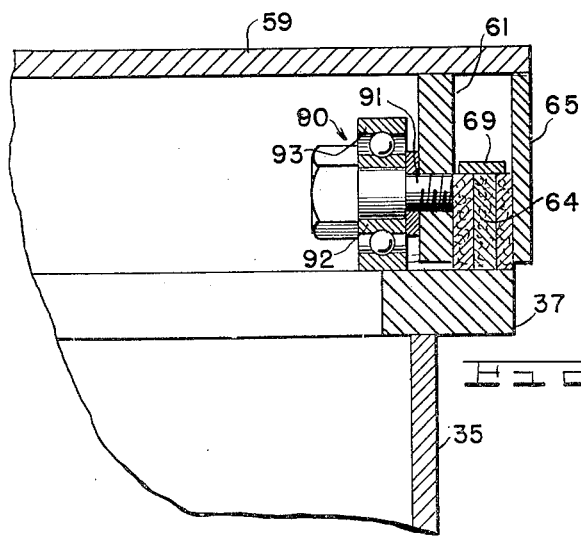
Fig. 11 is a partial vertical sectional view of a manifold, showing the details of a roller.

A plurality of rollers 90 are mounted within the top and bottom manifolds. These rollers are circumferentially spaced within the manifolds and are adapted to engage the annular plates 37, 40 which form parts of the top and bottom, respectively, of the rotatable drum. These rollers are adapted to prevent frictional surface engagement between the side walls of the manifolds and the top or bottom of the drum. These rollers are identical in construction and mounting and each comprises a threaded stud bolt 91 screwed into the side wall 61 of the manifold; a ball race 92 fixedly mounted on the bolt and a wheel 93 mounted on the ball race, all as shown in Fig. 11.

Three elbow-shaped pipes or conduits 94, 95 and 96 having threaded ends project through the cap of the vessel 17 and have their threaded ends secured to the top plate of the top manifold by means of lock nuts 97 (Fig. 5), which form gas-tight joints. The pipes are welded to the cap and hold the top manifold stationary relative to the rotation of the drum. The three pipes are circumferentially spaced with respect to the top manifold and each is secured to and communicates with the manifold at a point located between the seals.

Three additional pipes 98, 99 and 100, having threaded ends, project through the bottom of the vessel 17 and have their threaded ends secured to the bottom plate of the bottom manifold by means of lock nuts 101 which form gas-tight joints. These pipes are welded to the bottom of the vessel 17 and hold the bottom manifold stationary relative to the rotation of the drum. These pipes are circumferentially spaced with respect to the bottom manifold and each is secured to and communicates with the manifold at a point located between the seals. The width of the seals with respect to the radial compartments 43 containing the adsorbent units is such that at all times at least one of the partitions or diaphragms 44 is engaging the bottom plate 70 of the seal in gas-tight engagement. As clearly seen from the foregoing, the manifolds and drum are divided into three gas-tight sectors by the engagement of the radial partitions or diaphragms with the seals.

As the drum carrying the annular adsorbent containers rotates, they are continuously and successively moved through the three sectors, called, for convenience, the first stage, the second stage and the activation stage. The three elbow-shaped pipes 94, 95 and 96 are connected to pipe lines 7, 9 and 13, respectively; and the three pipes 98, 99 and 100 are connected to pipe lines 8, 10 and 12, respectively, by means of which the wet gas and hot gas flow into and through the dehydrator.

The flow of wet gas through the first and second dehydration stages and the flow of hot gases through the activation stage is schematically shown in Fig. 14.

The wet gas from which moisture and hydrocarbons are to be removed is supplied under high pressure by pipe line 7 and enters the top manifold of the first stage through pipe 94. Then it moves downwardly from the manifold through the opening in the top of the drum into the various compartments of the drum, containing the adsorber units, as are at that time contained within the sector forming the first stage. The gas passes through the pervious layer of adsorbent material, which removes part of the moisture content therefrom, into the hollow interior of the adsorber units, thence downwardly through the openings in the plates 45 into the bottom of the drum and through the opening therein into the bottom manifold. From the bottom manifold, the now partially dried gas passes through pipes 98 and 8 to the intercooler 2, where it is cooled. The intercooler 2 may be of the water circulating type. From the intercooler, the gas moves through pipes 9 and 95 into the top manifold of the second stage. The gas moves downwardly through the second stage, in a manner similar to its downward movement through the first stage, into the bottom manifold of the second stage, the remainder of the moisture content of the gas being removed during its passage through the second stage.

From the bottom manifold of the second stage, the now dried gas moves through pipes 99 and 10 to the various points of use.

The removal of moisture and hydrocarbons from the adsorbent material carried by the annular adsorber units is effected in the activation stage.

A portion of the incoming wet gas is diverted from the supply line 7 by means of a pipe line 11, through the heater 3, where its temperature is raised to from 300° F. to 600° F., depending upon the moisture content and the type of hydrocarbons to be recovered. From the heater, the heated gas passes through pipe lines 12 and 100 into the bottom manifold of the activation stage. From the bottom manifold, the hot gases pass through the opening in the bottom of the drum into the bottom of the various compartments of the drum as are at that time contained within the sector forming the activation stage, thence upwardly through the openings in the plates 45 and up into the hollow interior of the annular adsorber units, through the pervious solid layer of adsorbent material into the compartments of the drum. As the hot gas passes through the adsorbent material it removes the moisture and hydrocarbons therefrom. The hot, moisture-hydrocarbon laden gas then passes upwardly through the opening in the top of the drum into the top manifold. From the top manifold, the hot gas passes through pipe lines 96 and 13 to the condenser 4, where the moisture and hydrocarbons are condensed. The now cooled gas and the condensate pass from the condenser through pipe line 14 to the separator 5, where the condensate is separated from the gas. The water and hydrocarbons are drained from the bottom of the separator by means of drain line 15.

From the separator the gas passes through pipe line 16 back into the supply line 7, where it is mixed with the incoming gas on the way to the first dehydration stage. The process is continuous.

The chief purpose in mounting the annular drum and manifolds within the pressure vessel is to permit the equalization of pressure within the drum, manifolds and vessel, thereby permitting the drum and manifolds to be made of lighter weight material, which adds considerably to the efficient and economic operation of the dehydrator. This equalization of pressure is accomplished by means of a small opening 102 formed in that portion of the pipe line 94 within the vessel 17. And too, due to the unequal temperature of the gas as it passes through the various sectors, thereby resulting in unequal expansion of the parts of the drum and manifolds, it is considered desirable to provide each of the six pipes 94, 95, 96, 98, 99 and 100 with expansion joints 103, located a short distance from their points of connection to the manifolds. Suitable stop valves 104 and 105 are located in the pipe lines 7 and 11, respectively, to provide means for controlling the flow of gas through the dehydration and activation stages of the dehydrator.

Figure 15:
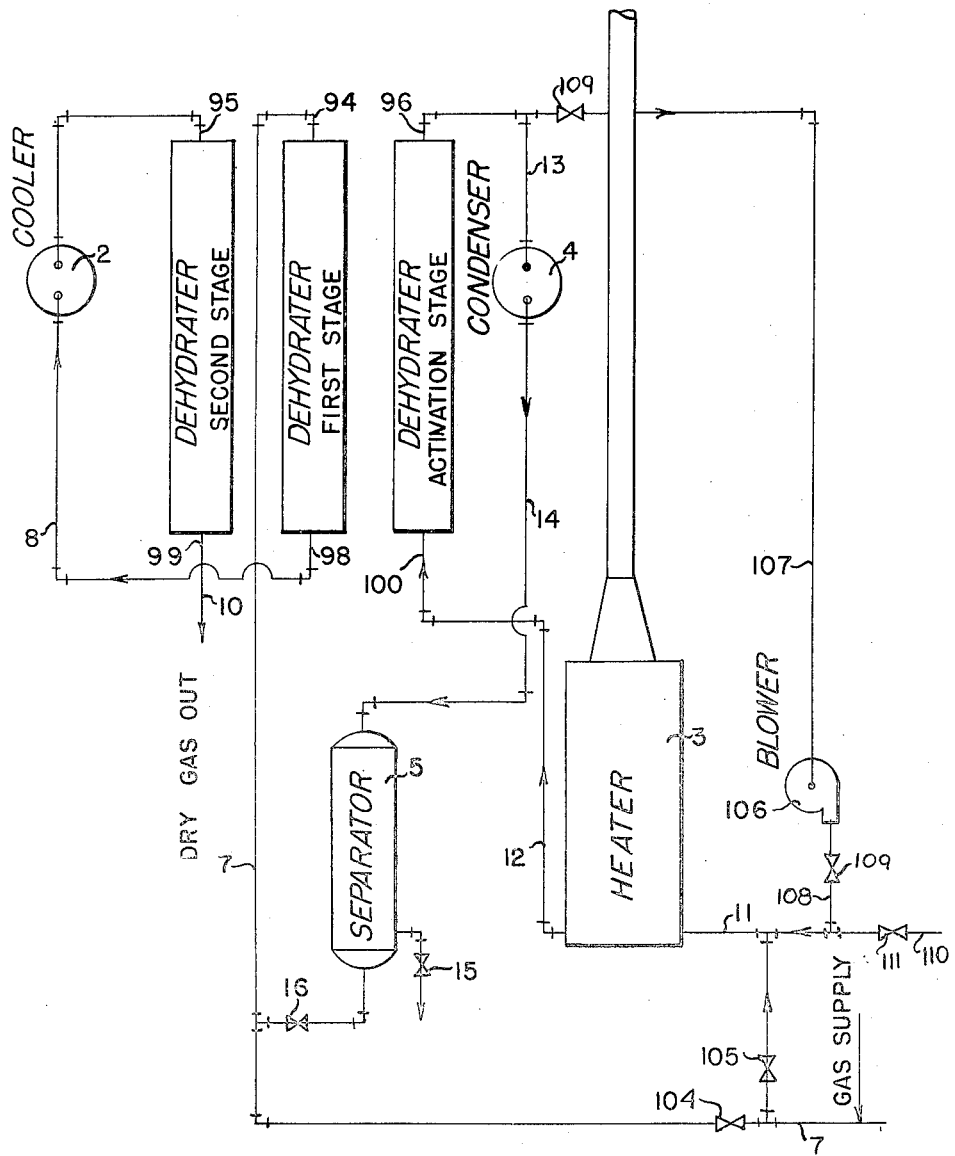
Fig. 15 is a schematic view to show a modification of the flow of hot gas through the activation stage and the condenser and separator.

In Fig. 15 there is shown a modification of the activation cycle. This modification is an alternative to that shown in Fig. 14 and is preferably used only in cases where the quantity of condensable vapors to be recovered from the gas is quite large.

The additional apparatus shown comprises a low pressure blower 106 for recirculating the hot gas through the heater and the activation stage of the dehydrator; a pipe line 107 connecting the inlet side of the blower to pipe line 13; and a pipe line 108 connecting the exhaust side of the blower to pipe line 11. Stop valves 109 are mounted in the pipe lines 107 and 108 to permit cutting off the circulation of gas through these pipe lines when desired.

In the modification shown in Fig. 15, the circulation of the wet gas through the first and second stage of the dehydrator is unchanged. The circulation of the heated gas through the heater and activation stage of the dehydrator is modified as shown to permit the continuous recirculation of the heated gas.

A portion of the hot gas and vapor stripped from the adsorbent in the activation stage is continuously withdrawn through pipe line 13 and passes through the condenser 4 where the moisture and condensable hydrocarbons are condensed. From the condenser the gas and the condensate pass through pipe line 14 to the separator 5 where the condensate is separated from the gas. The water and hydrocarbons are drained from the bottom of the separator by means of drain line 15. From the separator the gas passes through pipe line 16 back into the supply line 7, where it is mixed with the incoming gas on the way to the first dehydration stage.

The greater portion of the hot gas after its passage through the activation stage passes into pipe line 107 and is recirculated by the low pressure blower 106 through the pipe line 108 and the heater 3 back through the activation stage of the dehydrator. The process is continuous.

When the recirculating system is used the valve 104 is closed enough to force wet gas through the heater via valve 105 and pipe line 11, valve 105 being used to regulate the exact quantity of such gas permitted to flow to the heater.

The raw gas fed into the activation circuit is for the purpose of reducing the partial pressure of water vapor and condensable hydrocarbons in the activation stage, thereby facilitating the removal of such adsorbed products from the silica gel. The quantity of gases recirculated by the blower is dictated by the amount of heat required to heat up the silica gel in the activation stage and vaporize the water and hydrocarbons adsorbed therein. The valves 109 provide for controlling the quantities of recirculated gases. The recirculation of the hot gas through the activation stage is facilitated due to the thinness of the adsorbent in the tubular containers.

While the blower 106 has been described as a low pressure blower, it actually has to stand the full pressure of the system, and is low pressure only in the sense that it does not have to overcome much resistance in order to recirculate gases through the heater and activation stage of the dehydrator.

While the gas used for reactivating the adsorbent has been shown as being obtained from the supply line 7, obviously a different source could be used, as well as a different kind of gas, such as air or steam.

For this purpose a pipe line 110 having a stop valve 111 mounted therein has been shown as connected to pipe line 11. The pipe line 110 being connected to a suitable source of gas (not shown). By closing valve 105, the gas for the recirculating circuit may be obtained through pipe line 110.

Obviously, the invention is not restricted to the particular embodiments thereof herein shown and described. Moreover, it is not indispensable that all of the features of the invention be used conjointly, since they may be employed advantageously in various combinations and subcombinations. Moreover, the apparatus is capable of various uses, such as catalytic cracking and the treatment of various fluids to remove constituents therefrom.

What is claimed is:

1. In an apparatus for removing moisture and condensable hydrocarbon from gases, the combination, comprising a pressure vessel; an annular drum having continuous annular openings in its top and bottom rotatably mounted therein; a plurality of vertical partitions mounted in and dividing said drum into a plurality of radial compartments; a transversely extending partition provided with at least one opening mounted in each of said compartments and forming a gas-tight joint with the walls thereof, at least one elongated, annular adsorbent container located in each of said compartments and removably mounted on said partition, each container being closed at its top and having its hollow interior at its bottom end in communication with an opening in said partition; an upper annular manifold mounted in the top of said vessel, resilient means for holding said manifold in gas-tight engagement with the top of said drum with the manifold communicating with the opening in the top of the drum; a lower manifold mounted in the bottom of said vessel; resilient means for holding said lower manifold in gas-tight engagement with the bottom of said drum with the manifold communicating with the opening in the bottom of the drum; a plurality of sealing means located in each of said manifolds and cooperating with said partitions to divide the drum and the manifolds into a plurality of sectors, each sector being gas-tight with respect to its adjacent sectors; means for passing heated gases through one of said sectors; means for passing the gases from which moisture and condensable hydrocarbons are to be removed in succession through the other of said sectors; means, included in said last two named means, for holding said manifolds stationary relative to the rotary movement of said drum; and means for rotating said drum whereby said compartments with the adsorbent containers are continuously and successively moved through each of said sectors.

2. In an apparatus for removing and recovering moisture and condensable hydrocarbons from gases, as set forth in claim 1, wherein each of said sealing means comprises a spaced pair of transversely extending walls mounted in the manifolds; a bottom sealing plate vertically slidably mounted within said walls; and resilient means urging said sealing plate toward said drum; and wherein said vertical partitions have their top and bottom ends provided with a gasket which forms a gas-tight fit with said sealing plates when they are brought into contact with each other as said drum revolves.

3. In an apparatus for removing and recovering moisture and condensable hydrocarbons from gases, as set forth in claim 1, including means for equalizing the gas pressure within the cylindrical vessel, the rotatable drum and the manifolds.

4. In an apparatus for removing and recovering moisture and condensable hydrocarbons from gases, as set forth in claim 1, wherein the means for passing the gases from which moisture and condensable hydrocarbons are to be removed and the heated gases through the various sectors, each includes a section of high pressure resisting pipe line having an expansion joint therein, with all of the joints being located within the high pressure resisting vessel.

5. In an apparatus for removing and recovering moisture and condensable hydrocarbons from gases, as set forth in claim 1, wherein each of said sealing means comprises a spaced pair of transversely extending walls mounted in the manifolds; a bottom sealing plate vertically slidably mounted within said walls; gaskets mounted on at least two side edges of said plate; resilient means urging said gaskets against the walls of the seal; and resilient means urging said sealing plate toward said drum, and wherein gaskets are mounted on the top and bottom ends of said vertical partitions and resilient means are provided for urging the gaskets into gas-tight engagement with the bottom of said sealing plate and wherein means are provided for engaging said gaskets when they are not engaged by said seals to resist the thrust of said last named resilient means.

6. An apparatus of the character described, comprising a cylindrical pressure vessel closed at one end and having a removable cover secured to the other end; a rotary member mounted in said vessel for rotation about its longitudinal axis and having a plurality of axially extending compartments, each of said compartments having a pair of spaced openings therein; a foraminous container adapted to hold granular adsorbent material removably mounted in each of said compartments and positioned to cause fluid entering said compartments to pass through the adsorbent material; a pair of spaced stationary annular manifolds adjacent to the opposite ends of said pressure vessel having radial partitions therein dividing them into a plurality of separate corresponding fluid passage sectors, a plurality of conduits connected to and extending through the covered and the closed end of said pressure vessel, with each conduit connected to one of said manifolds and communicating with one of said sectors therein, said conduits holding the manifolds stationary with respect to said pressure vessel; each of said sectors having an opening therein for the passage of fluid to and from said compartments; said manifolds being mounted to slidably engage said rotary member as it rotates and being positioned so that the spaced openings in said compartments will be brought successively into communication with the openings in the corresponding sectors of the spaced manifolds respectively as the rotary member rotates, whereby fluids will flow axially from the sectors in one of the manifolds through successive compartments of the rotary member as it rotates; then through the corresponding sectors in the other manifold; means for supplying heated gas to one of said conduits, so that it will pass through successive compartments in said rotary member and activate the contained adsorbent material therein; means for supplying and directing the flow of gas to be treated through the remaining conduits and successive compartments in said rotary member; and means for equalizing the gas pressure within said cylindrical vessel, said manifolds and said rotary member.

7. An apparatus as set forth in claim 6, wherein said foraminous containers are elongated and annular and have hollow interiors, with their hollow interiors closed at one of their ends and open at the other of their ends and wherein said containers are mounted in said compartments with the open ends of their hollow interiors in communication with one of the openings in said compartments.

ERNEST B. MILLER.

REFERENCES CITED

The following references are of record in the file of this patent:

UNITED STATES PATENTS

| Number | Name | Date |
|---|---|---|
| 1,522,480 | Allen | Jan. 13, 1925 |
| 1,528,459 | Voress et al. | Mar. 3, 1925 |
| 1,577,534 | Miller | Mar. 23, 1926 |
| 1,590,266 | Tiedtke et al. | June 29, 1926 |
| 1,602,500 | Nuss | Oct. 12, 1926 |
| 1,912,784 | Miller et al. | June 6, 1933 |
| 1,948,779 | Abbott et al. | Feb. 27, 1934 |
| 2,053,159 | Miller | Sept. 1, 1936 |
| 2,101,555 | Moore et al. | Dec. 7, 1937 |
| 2,246,345 | Campbell | June 17, 1941 |
| 2,294,214 | Seinfeld | Aug. 25, 1942 |